(12) United States Patent
Foisie et al.

(10) Patent No.: US 11,851,188 B2
(45) Date of Patent: Dec. 26, 2023

(54) FLEXIBLE ACTUATION ASSEMBLY FOR AN AIRCRAFT COMPONENT

(71) Applicant: AMI INDUSTRIES, INC., Colorado Springs, CO (US)

(72) Inventors: Douglas A Foisie, Colorado Springs, CO (US); Kyler J. Marutzky, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 894 days.

(21) Appl. No.: 16/743,832

(22) Filed: Jan. 15, 2020

(65) Prior Publication Data

US 2021/0347488 A1 Nov. 11, 2021

(51) Int. Cl.
*E05C 9/04* (2006.01)
*B64D 11/06* (2006.01)
*E05B 79/20* (2014.01)

(52) U.S. Cl.
CPC ...... *B64D 11/0691* (2014.12); *B64D 11/0627* (2014.12); *E05C 9/04* (2013.01)

(58) Field of Classification Search
CPC ........... Y10T 292/082; Y10T 292/0834; Y10T 292/0836; Y10T 292/0841; Y10T 292/0855; Y10T 292/0894; Y10T 292/0907; Y10T 292/0902; Y10T 292/1017; Y10T 292/0845; Y10T 292/0859; Y10T 292/0901; Y10S 292/16; Y10S 292/38; E05B 79/20; E05B 83/30
USPC ............ 292/37, 38, 42, 50, 80, 81, 163, 171
See application file for complete search history.

(56) References Cited

U.S. PATENT DOCUMENTS

| 86,601 | A | * | 2/1869 | Still | ......................... | E05C 19/06 |
| | | | | | | 292/87 |
| 1,269,572 | A | * | 6/1918 | Allenbaugh | ............ | E05C 9/045 |
| | | | | | | 292/37 |
| 1,490,575 | A | * | 4/1924 | Masury | ................. | E05B 83/243 |
| | | | | | | 292/87 |

(Continued)

FOREIGN PATENT DOCUMENTS

| AU | 247856 B | 6/1959 |
| CN | 2703911 Y | 6/2005 |

(Continued)

OTHER PUBLICATIONS

Extended Search Report for European Application No. 21151669.5 dated Jun. 7, 2021, 6 pages.

*Primary Examiner* — Carlos Lugo
(74) *Attorney, Agent, or Firm* — Suiter Swantz pc llo

(57) ABSTRACT

A flexible actuation assembly for an aircraft component may include a flexible linkage including at least one primary element. The at least one primary element may be coupled to at least one locking pin of the flexible actuation assembly via at least one interlocking assembly. The flexible linkage may be coupled to an actuator of an aircraft component. The flexible linkage may be configured to retract the at least one locking pin from a lock position when a load applied to the actuator is translated through the flexible linkage. The flexible linkage may be fabricated from a material with a spring force able to return the at least one locking pin to the lock position when the load is removed from the actuator.

9 Claims, 10 Drawing Sheets

(56) References Cited

U.S. PATENT DOCUMENTS

| | | | | |
|---|---|---|---|---|
| 1,691,975 | A | * | 11/1928 | Irwin .................... E05B 65/006 292/DIG. 16 |
| 1,884,201 | A | * | 10/1932 | Phillippe ............. E05B 65/0057 27/DIG. 1 |
| 1,906,318 | A | * | 5/1933 | Jensen .................... E04H 13/00 27/35 |
| 1,929,341 | A | * | 10/1933 | Wegner ............... E05B 65/0057 292/6 |
| 1,964,114 | A | * | 6/1934 | Gerlach .................. D06F 37/10 292/36 |
| 2,389,315 | A | * | 11/1945 | Kerr .......................... B60J 9/02 49/141 |
| 2,497,485 | A | * | 2/1950 | Yost ........................ E05B 77/46 292/DIG. 3 |
| 3,910,611 | A | | 10/1975 | Slovensky, Jr. |
| 4,325,526 | A | * | 4/1982 | Kitagawa .................. F16L 3/23 24/336 |
| 4,444,431 | A | | 4/1984 | Suzuki |
| 4,460,215 | A | | 7/1984 | Chamberlain et al. |
| 4,799,632 | A | * | 1/1989 | Baymak ............. B64D 11/0691 297/14 |
| 4,971,372 | A | * | 11/1990 | Gunderson ........... E05C 19/066 292/87 |
| 6,082,805 | A | | 7/2000 | Gray et al. |
| 6,105,782 | A | * | 8/2000 | Fujimori ........... H01L 21/67373 206/710 |
| 6,170,892 | B1 | * | 1/2001 | Lantiegne ........... E05B 65/0007 292/237 |
| 6,536,592 | B1 | * | 3/2003 | Chang ............... H01L 21/67373 70/432 |
| 6,572,205 | B2 | * | 6/2003 | Tagawa ................. G11B 33/025 312/223.1 |
| 6,623,051 | B2 | * | 9/2003 | Bonora ................... E05C 9/047 292/330 |
| 6,874,827 | B1 | * | 4/2005 | Dodson ............... E05B 17/0012 292/288 |
| 8,182,000 | B2 | * | 5/2012 | Mitchell, Jr. .......... E05B 79/20 292/DIG. 16 |
| 2014/0319275 | A1 | | 10/2014 | Najd et al. |
| 2015/0158589 | A1 | | 6/2015 | Meckes et al. |
| 2016/0376007 | A1 | * | 12/2016 | Meindlhumer .... B64D 11/0691 297/14 |

FOREIGN PATENT DOCUMENTS

| | | | |
|---|---|---|---|
| CN | 109667504 A | 4/2019 | |
| DE | 3631726 A1 | 3/1988 | |
| DE | 102009031686 A1 * | 1/2011 | ........... E05B 53/003 |
| EP | 0189531 B1 | 4/1989 | |
| EP | 3078594 A1 | 10/2016 | |
| FR | 2797238 A1 * | 2/2001 | ........... E05B 63/128 |
| FR | 2817897 A1 * | 6/2002 | ............... B60R 7/06 |
| GB | 2279395 A | 1/1995 | |
| WO | 9925944 A1 | 5/1999 | |
| WO | 2012054361 A1 | 4/2012 | |
| WO | 2016030843 A1 | 3/2016 | |
| WO | 2019229511 A1 | 12/2019 | |

\* cited by examiner

FLEXIBLE ACTUATION ASSEMBLY FOR AN AIRCRAFT COMPONENT

BACKGROUND

Select aircraft components are actuated via one or more actuation assemblies. The one or more actuation assemblies may include one or more rotation assemblies, one or more translation assemblies, and/or a combination of rotation and translation assemblies where rotation is converted to translation. The complexity of the one or more actuation assemblies may increase the cost of the aircraft component and/or may increase the possibility of aircraft component malfunction (e.g., due to part wear or failure) or complete breakdown (e.g., following repeated use, during an emergency situation, or the like).

SUMMARY

A flexible actuation assembly for an aircraft component is disclosed, in accordance with one or more embodiments of the disclosure. The assembly may include a flexible linkage including at least one primary element. The at least one primary element may be coupled to at least one locking pin of the flexible actuation assembly via at least one interlocking assembly. The flexible linkage may be coupled to an actuator of an aircraft component. The flexible linkage may be configured to retract the at least one locking pin from a lock position when a load applied to the actuator is translated through the flexible linkage. The flexible linkage may be fabricated from a material with a spring force able to return the at least one locking pin to the lock position when the load is removed from the actuator.

In some embodiments, the assembly further include an extension linkage coupled to the actuator. The extension linkage may be coupled to the flexible linkage via a coupling joint.

In some embodiments, the coupling joint may include an extension linkage paddle of the extension linkage and a flexible linkage paddle of the flexible linkage. The extension linkage paddle may be coupled to the flexible linkage paddle.

In some embodiments, the flexible linkage may include at least one auxiliary element.

In some embodiments, the at least one primary element and the at least one auxiliary element may form a closed geometry. At least one dimension of the closed geometry may be configured to change when the load is translated through the flexible linkage.

In some embodiments, one or more of the at least one primary element or the at least one auxiliary element may form an open geometry. At least one dimension of the open geometry may be configured to change when the load is translated through the flexible linkage.

In some embodiments, the at least one interlocking assembly may include a first component on the flexible linkage and a second component on the at least one locking pin.

In some embodiments, the flexible linkage may be configured to uncouple from the at least one locking pin when the first component on the flexible linkage and the second component on the at least one locking pin are disengaged.

In some embodiments, the flexible linkage may be coupled to the aircraft component.

In some embodiments, the flexible linkage may include a mount plate. The mount plate may be coupled to the aircraft component.

In some embodiments, the flexible linkage may be coupled to the actuator of the aircraft component via a coupling joint.

In some embodiments, the coupling joint may include a mount plate of the flexible linkage and a mount plate of the actuator. The mount plate of the flexible linkage may be coupled to the mount plate of the actuator.

In some embodiments, the aircraft component may include an aircraft seat pan. The aircraft seat pan may be configured to transition between an upright position and a recline position when the flexible linkage retracts the at least one locking pin.

In some embodiments, the aircraft component may include an aircraft stowage compartment door. The aircraft stowage compartment door may be configured to open and provide access to a stowage compartment when the flexible linkage retracts the at least one locking pin.

A flexible actuation assembly for an aircraft component is disclosed, in accordance with one or more embodiments of the disclosure. The assembly may include a flexible linkage including at least one primary element. The at least one primary element may be coupled to at least one locking pin of the flexible actuation assembly via at least one interlocking assembly. The flexible linkage may be configured to engage an actuator of an aircraft component. The flexible linkage may be configured to retract the at least one locking pin from a lock position when a load applied to the actuator is translated through the flexible linkage. The flexible linkage may be fabricated from a material with a spring force able to return the at least one locking pin to the lock position when the load is removed from the actuator.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
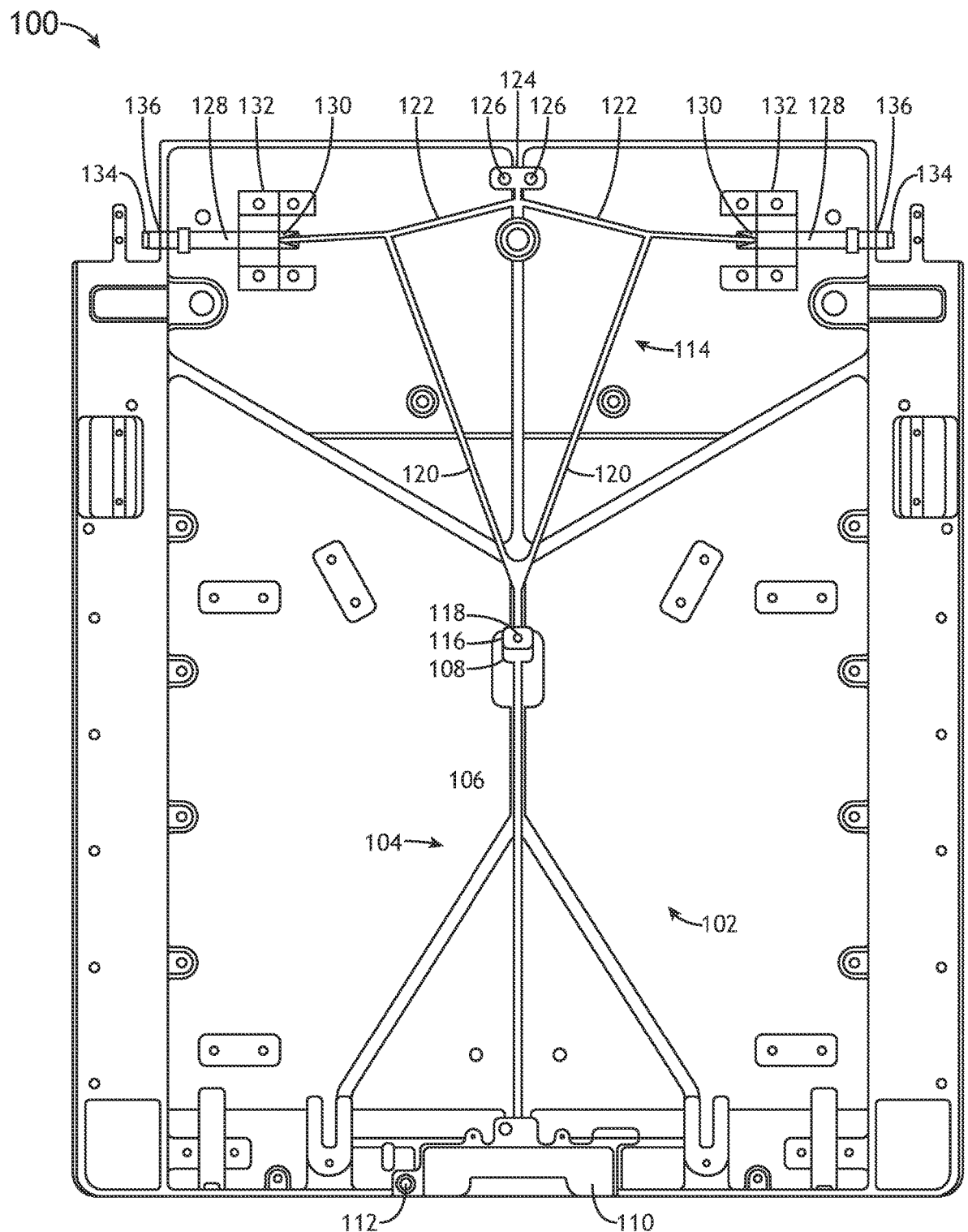
FIG. 1A illustrates a seat pan including a flexible actuation assembly, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-3B generally illustrate a flexible actuation assembly for an aircraft component, in accordance with one or more embodiments of the disclosure.

Select aircraft components are actuated via one or more actuation assemblies. The one or more actuation assemblies may include one or more rotation assemblies, one or more translation assemblies, and/or a combination of rotation and translation assemblies where rotation is converted to translation. The complexity of the one or more actuation assemblies may increase the cost of the aircraft component and/or may increase the possibility of aircraft component malfunction (e.g., due to part wear or failure) or complete breakdown (e.g., following repeated use, during an emergency situation, or the like).

For example, select aircraft seats (e.g., crew member seats) may include adjuster systems configured to actuate the aircraft seats from an upright position to one or more reclined positions. For instance, one variant of the adjuster system includes converting a rotational movement of an actuatable handle into a translational (e.g., linear) movement of seat pan locking pins. Actuation of this particular variant of the adjuster system may require the interaction of many parts, which may result in an increasing possibility of aircraft seat malfunction or complete breakdown.

By way of another example, select aircraft stowage compartments may include a rotatable lever or push-button system configured to actuate an aircraft stowage compartment door. The rotatable lever or push-button system may include converting movement in a first direction (e.g., rotation or translation) into movement in a second direction (e.g., pin translation, latch disengaging, or the like).

Should the adjuster system malfunction or have a complete breakdown, it may not be feasible to correct or repair the problem without replacing the entire aircraft component to which the adjuster system is coupled and configured to operate.

As such, it would be beneficial to provide a flexible actuation assembly for an aircraft component that reduces a possibility of aircraft seat malfunction or complete breakdown. For example, the flexible actuation assembly may include a fewer number of parts than known adjuster systems. By way of another example, the flexible actuation assembly may include more easily swappable components than known adjuster systems.

FIGS. 1A-1D generally illustrate an aircraft component 100 (e.g., a seat pan 100) with a flexible actuation assembly 102, in accordance with one or more embodiments of the disclosure.

The flexible actuation assembly 102 may include an extension linkage 104. The extension linkage 104 may include an element 106 and a paddle 108. The extension linkage 104 may be coupled to an actuator 110. The actuator 110 may include, but is not limited to, a handle 110. For example, the handle 110 may be configured to rotate about an axis through one or more pivot pins 112. By way of another example, the handle 110 may be configured to translate along an axis via one or more rails, tracks, sliders, or the like. In general, the actuator 110 may be any component (e.g., handle, lever, knob, button, toggle, or the like) configured to act on the extension linkage 104 when the actuator 110 is engaged via any rotational movement or translational movement.

The flexible actuation assembly 102 may include a flexible linkage 114. The flexible linkage 114 may include a paddle 116. The paddle 116 of the flexible linkage 114 may be coupled to the paddle 108 of the extension linkage 104. For example, the paddle 116 of the flexible linkage 114 may be coupled to the paddle 108 of the extension linkage 104 via one or more fasteners (e.g., screws, nuts, washers, or the like), an adhesive, or the like.

The paddle 108 of the extension linkage 104 and the paddle 116 of the flexible linkage 114 may be considered components of a coupling joint 118, for purposes of the disclosure. It is noted herein, however, that the extension linkage 104 and the flexible linkage 114 may be fabricated as a single component, such that the coupling joint 118 may not be necessary. Here, the flexible linkage 114 may be coupled to the actuator 110 via the coupling joint 118. Therefore, the above description should not be interpreted as a limitation on the present disclosure but merely an illustration.

The flexible linkage 114 may include one or more primary elements 120 and one or more auxiliary elements 122. The one or more primary elements 120 and the one or more auxiliary elements 122 may form a select geometry. For example, the select geometry may include a shape with a closed area having 2, 3, up to an N number of sides. For instance, the shape may include, but is not limited to, a kite, a diamond, a letter A, or the like. By way of another example, the select geometry may include a shape with an open area. For instance, the shape may include, but is not limited to, a letter T, I, V, or the like.

The flexible linkage 114 may be coupled to the seat pan 100 via a mount plate 124. For example, the mount plate 124 and the flexible linkage 114 may be fabricated as a single component. By way of another example, the flexible linkage 114 may be pinned behind the mount plate 124 and the seat pan 100. Some combination of the flexible linkage 114, the mount plate 124, and/or the seat pan 100 may be coupled together via one or more fasteners 126 (e.g., screws, nuts, washers, or the like), an adhesive, or the like. It is noted herein, however, that the elements 120, 122 of the flexible linkage 114 may be configured to engage with the seat pan 100 (e.g., with one or more protrusions), such that the mount plate 124 may not be necessary. For example, where the elements 120, 122 form a closed geometry, the elements 120, 122 may be held in place by a protrusion of the seat pan 100 passing through the closed geometry. Therefore, the above description should not be interpreted as a limitation on the present disclosure but merely an illustration.

The flexible actuation assembly 102 may include one or more locking pins 128. The flexible linkage 114 (e.g., the one or more auxiliary elements 122 and/or the one or more primary elements 120) and the one or more locking pins 128 may be coupled together via an interlocking assembly 130. For example, the interlocking assembly 130 may include a cut-out (e.g., a slot, a recess, a notch, a hole, a groove, or the like) on a locking pin 128 configured to receive a portion of the flexible linkage 114 (e.g., a protrusion or cap on an auxiliary element 122 and/or a primary element 120). It is noted herein, however, that the one or more locking pins 128 and the flexible linkage 114 may be coupled together via one or more fasteners (e.g., screws, nuts, washers, or the like), an adhesive, or the like. Therefore, the above description should not be interpreted as a limitation on the present disclosure but merely an illustration.

Although embodiments of the disclosure illustrate the flexible linkage 114 as including the one or more primary elements 120 and the one or more auxiliary elements 122, it is noted herein the flexible linkage 114 may include a single complex element configured to engage and actuate with the one or more locking pins 128. Therefore, the above description should not be interpreted as a limitation on the present disclosure but merely an illustration.

It is noted herein the coupling joint 118 and/or the interlocking assembly 130 may be quick-release to allow for a swap of at least the flexible linkage 114, in the event of a malfunction or complete breakdown. For example, the coupling joint 118 and/or the interlocking assembly 130 may include tab-and-slot or tab-and-groove assemblies configured to couple the corresponding components together without the need for fasteners, adhesives, tools, or the like. For instance, the flexible linkage 114 may include a first component and the one or more locking pins 128 may include a second component, where disengaging the first component from the second component may uncouple the flexible linkage 114 from the one or more locking pins 128. In addition, the extension linkage 104 may include a first component and the actuator 110 may include a second component, where disengaging the first component from the second component may uncouple the extension linkage 104 from the actuator 110. Further, the flexible linkage 114 may include a first component and the extension linkage 104 (or the actuator 110) may include a second component, where disengaging the first component from the second component may uncouple the flexible linkage 114 from the extension linkage 104 (or the actuator 110). Therefore, the above description should not be interpreted as a limitation on the present disclosure but merely an illustration.

Each of the one or more locking pins 128 may be held in place against the seat pan 100 via a bracket 132. An end 134 of the one or more locking pins 128 may be configured to pass through a cut-out 136 (e.g., a slot, a recess, a notch, a hole, a groove, or the like) in the side surface of the seat pan 100 and engage a cut-out (e.g., a slot, a recess, a notch, a hole, a groove, or the like) in an aircraft seat 138. Although embodiments of the disclosure illustrate each of the one or more locking pins 128 as being held in place and aligned with the cut-out 136 in the side surface of the seat pan 100 via the bracket 132, it is noted herein the cut-out 136 may be sufficient to hold the one or more locking pins 128 in place against the seat pan 100 (e.g., depending on the tolerance and/or clearance of the end 134 of the one or more locking pins 128 relative to the corresponding cut-out within the aircraft seat 138). Therefore, the above description should not be interpreted as a limitation on the present disclosure but merely an illustration.

The flexible linkage 114 (e.g., the one or more primary elements 120 and/or the one or more auxiliary elements 122) may be fabricated from a material configured to introduce a select amount of inherent spring force into the flexible actuation assembly 102.

Figure 1B:
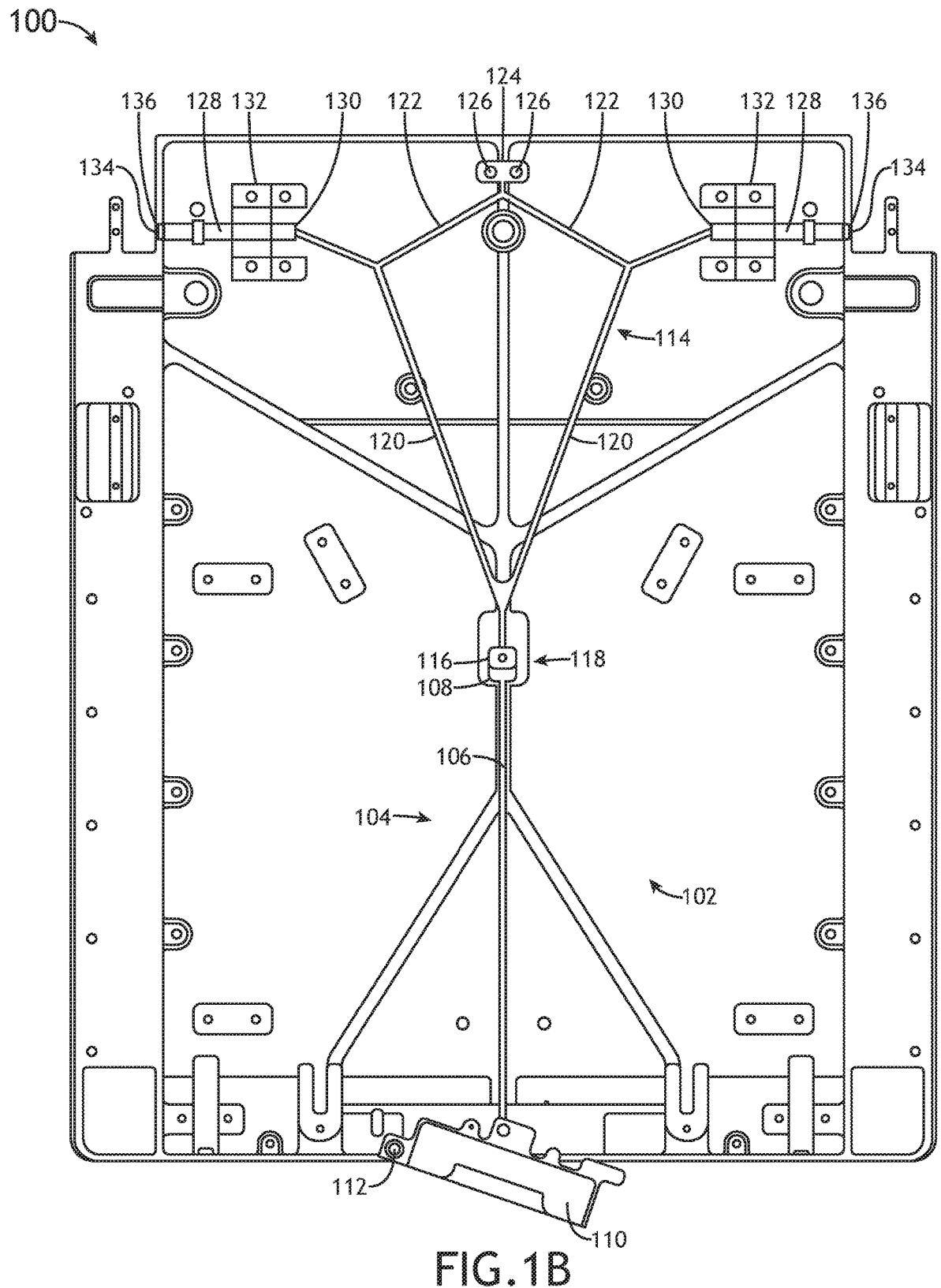
FIG. 1B illustrates a seat pan including a flexible actuation assembly, in accordance with one or more embodiments of the disclosure.
Figure 1C:
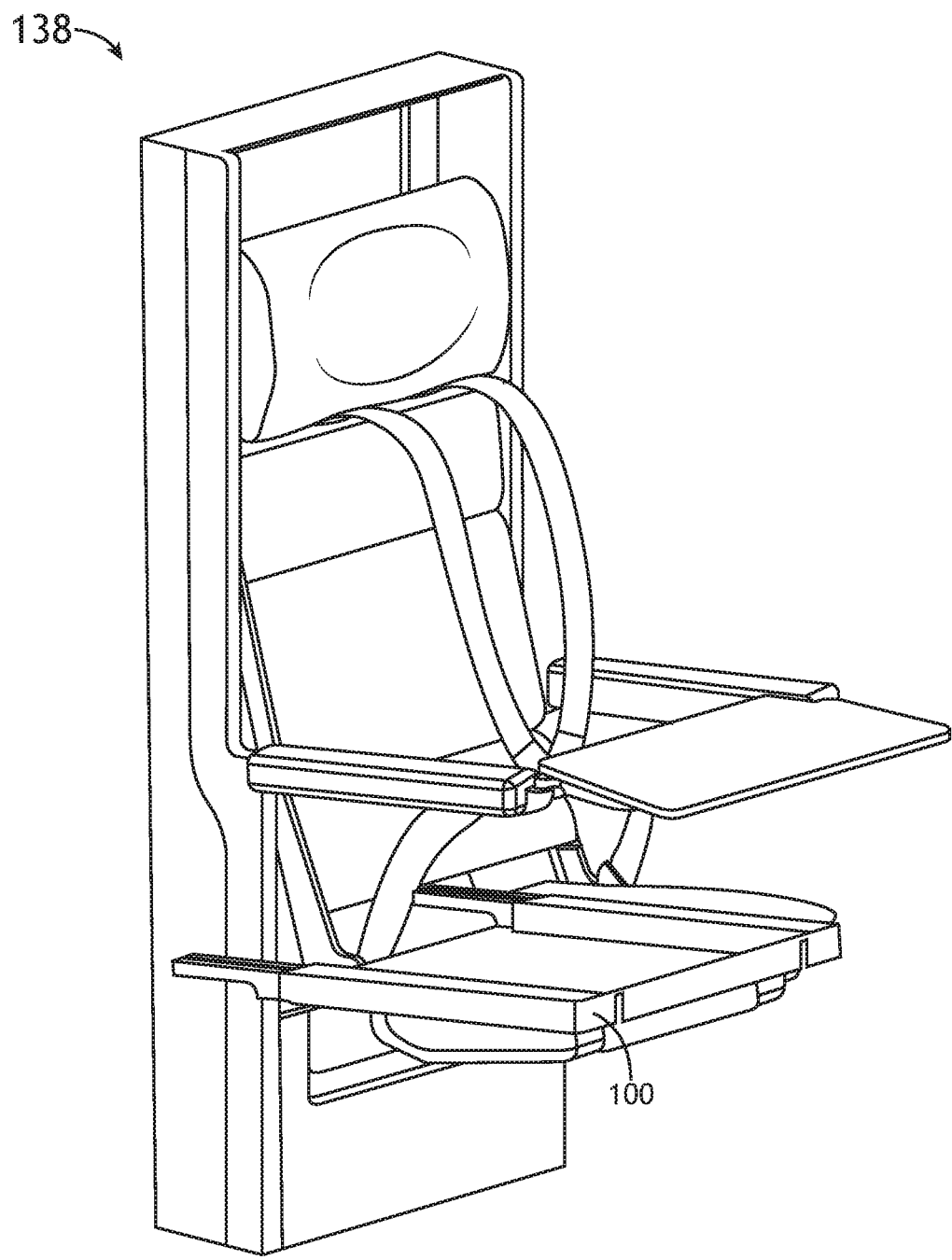
FIG. 1C illustrates an aircraft seat with a seat pan including a flexible actuation assembly, in accordance with one or more embodiments of the disclosure.

As illustrated in FIGS. 1A and 1C, the inherent spring force may cause the one or more locking pins 128 to engage the aircraft seat 138 when the actuator 110 is not actuated. Engaging the aircraft seat 138 may lock the seat pan 100 in an upright position or one or more reclined positions.

Figure 1D:
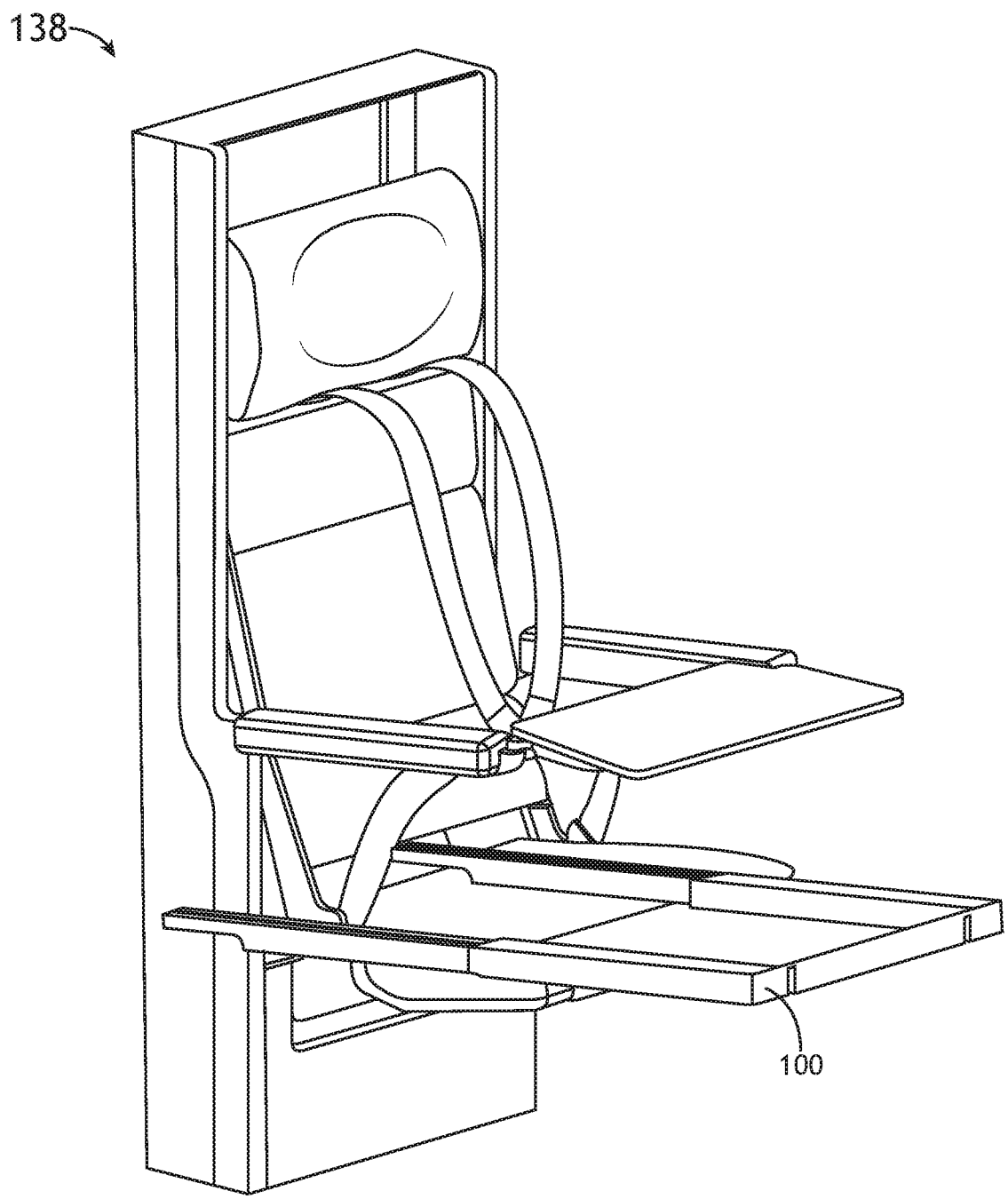
FIG. 1D illustrates an aircraft seat with a seat pan including a flexible actuation assembly, in accordance with one or more embodiments of the disclosure.

As illustrated in FIGS. 1B and 1D, the inherent spring force may be overcome when the actuator 110 is engaged, such that the one or more locking pins 128 are unlocked from the aircraft seat 138. For example, engaging the actuator 110 may translate a load through the extension linkage 104 and into the flexible linkage 114, causing the flexible linkage 114 to bend, which may retract the one or more locking pins 128. Disengaging the one or more locking pins 128 may allow the seat pan 100 to transition between the upright position and the one or more reclined positions (e.g., along one or more rails, tracks, sliders, or the like).

When the actuator 110 is disengaged, the inherent spring force may cause the one or more locking pins 128 to return to a locked position (e.g., extended outward position). It is noted herein the ends 134 of the one or more locking pins 128 may be configured in a way to allow the one or more locking pins 128 to engage the aircraft seat 138 without outside assistance (e.g., an outside external force).

It is noted herein that overcoming the spring force may cause the geometry of the flexible linkage 114 to elastically deform (e.g., as illustrated between FIG. 1A and FIG. 1B) and change one or more dimensions of the flexible linkage 114. For example, the one or more elements 120, 122 may increase in length (e.g., stretch) or decrease in length (e.g., contract). By way of another example, the one or more angles between the one or more elements 120, 122 may change. For instance, a 12-degree rotation of the actuator 110 may allow for a translation of the one or more locking pins 128 by 0.4 inches. It is noted herein, however, that the flexible actuation assembly 102 may be configured to allow for any amount of rotation being converted to any distance translation.

Although embodiments of the disclosure illustrate the flexible linkage 114 as including enough of a spring force to return the one or more locking pins 128 to the engaged position (e.g., extended outward position) following a disengaging of the actuator 110, it is noted herein the bracket 132 may include one or more springs in addition to or in the alternative to the inherent spring force of the flexible linkage 114, to assist in returning the one or more locking pins 128 to the engaged position (e.g., extended outward position). Therefore, the above description should not be interpreted as a limitation on the present disclosure but merely an illustration.

FIGS. 2A-2D generally illustrate an aircraft component 200 (e.g., an aircraft stowage compartment door 200) with a flexible actuation assembly 202, in accordance with one or more embodiments of the disclosure.

The flexible actuation assembly 202 may include a flexible linkage 204. The flexible linkage 204 may include a mount plate 206. The mount plate 206 of the flexible linkage 204 may be coupled to a mount plate 208 of an actuator 210. For example, the mount plate 206 of the flexible linkage 204 may be coupled to the mount plate 208 of the actuator 210 via one or more fasteners (e.g., screws, nuts, washers, or the like), an adhesive, or the like.

The mount plate 206 of the flexible linkage 204 and the mount plate 208 of the actuator 210 may be considered components of a coupling joint 212, for purposes of the disclosure.

The actuator 210 may include, but is not limited to, a handle 210. For example, the handle 210 may be configured to rotate about an axis through one or more pivot pins 214. By way of another example, the handle 210 may be configured to translate along an axis via one or more rails, tracks, sliders, or the like. In general, the actuator 210 may be any component (e.g., handle, lever, knob, button, toggle, or the like) configured to act on the flexible linkage 204 when the actuator 210 is engaged via any rotational movement or translational movement.

The flexible linkage 204 may include one or more primary elements 216 coupled to the mount plate 208. The flexible actuation assembly 202 may include one or more locking pins 218. The flexible linkage 204 (e.g., the one or more primary elements 216) and the one or more locking pins 218 may be coupled together via an interlocking assembly 220.

For example, the interlocking assembly 220 may include a cut-out (e.g., a slot, a recess, a notch, a hole, a groove, or the like) on a locking pin 218 configured to receive a portion of the flexible linkage 204 (e.g., a protrusion or cap on a primary element 216). It is noted herein, however, that the one or more locking pins 218 and the flexible linkage 204 may be coupled together via one or more fasteners (e.g., screws, nuts, washers, or the like), an adhesive, or the like. Therefore, the above description should not be interpreted as a limitation on the present disclosure but merely an illustration.

It is noted herein the coupling joint 212 and/or the interlocking assembly 220 may be quick-release to allow for a swap of at least the flexible linkage 204, in the event of a malfunction or complete breakdown. For example, the coupling joint 212 and/or the interlocking assembly 220 may include tab-and-slot or tab-and-groove assemblies configured to couple the corresponding components together without the need for fasteners, adhesives, tools, or the like. For instance, the flexible linkage 204 may include a first component and the one or more locking pins 218 may include a second component, where disengaging the first component from the second component may uncouple the flexible linkage 204 from the one or more locking pins 218. In addition, the flexible linkage 204 may include a first component and the actuator 210 may include a second component, where disengaging the first component from the second component may uncouple the flexible linkage 204 from the actuator 210. Therefore, the above description should not be interpreted as a limitation on the present disclosure but merely an illustration.

Although embodiments of the disclosure illustrate the flexible linkage 204 as including only the one or more primary elements 216, it is noted herein the flexible linkage 204 may include one or more auxiliary elements. The one or more primary elements 216 and the one or more auxiliary elements may form a select geometry. For example, the select geometry may include a shape with a closed area having 2, 3, up to an N number of sides. For instance, the shape may include, but is not limited to, a kite, a diamond, a letter A, or the like. By way of another example, the select geometry may include a shape with an open area. For instance, the shape may include, but is not limited to, a letter T, I, V, or the like.

Each of the one or more locking pins 218 may be held in place within a channel of a body 222 of the aircraft stowage compartment door 200 (or via a bracket coupled to the aircraft stowage compartment door 200). An end 224 of the one or more locking pins 218 may be configured to pass through a cut-out 226 (e.g., a slot, a recess, a notch, a hole, a groove, or the like) in the side surface of the body 222 and engage a cut-out (e.g., a slot, a recess, a notch, a hole, a groove, or the like) in a sidewall of an aircraft stowage compartment 228.

The flexible linkage 204 (e.g., the one or more primary elements 216) may be fabricated from a material configured to introduce a select amount of inherent spring force into the flexible actuation assembly 202.

Figure 2A:
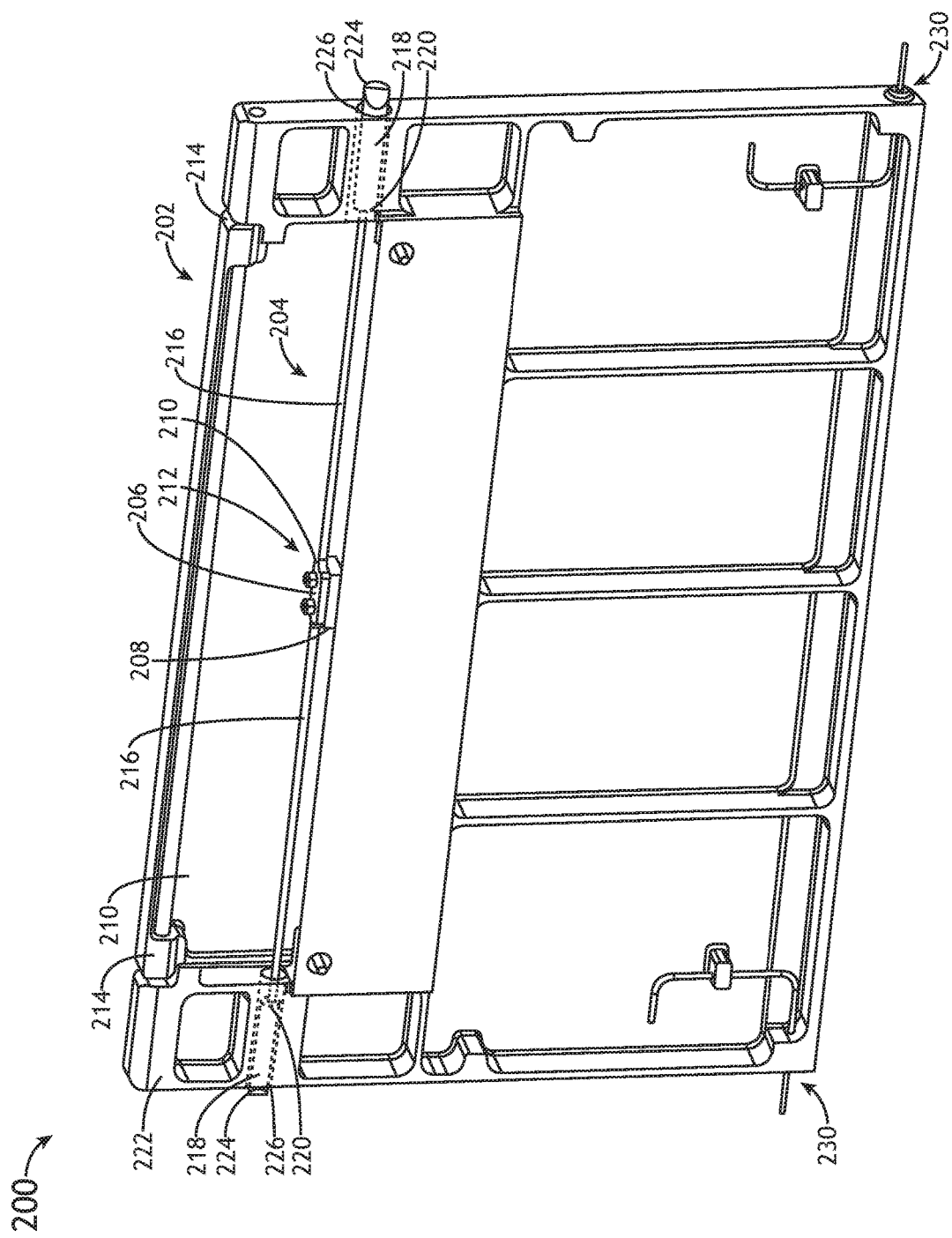
FIG. 2A illustrates an aircraft stowage compartment door including a flexible actuation assembly, in accordance with one or more embodiments of the disclosure.
Figure 2B:
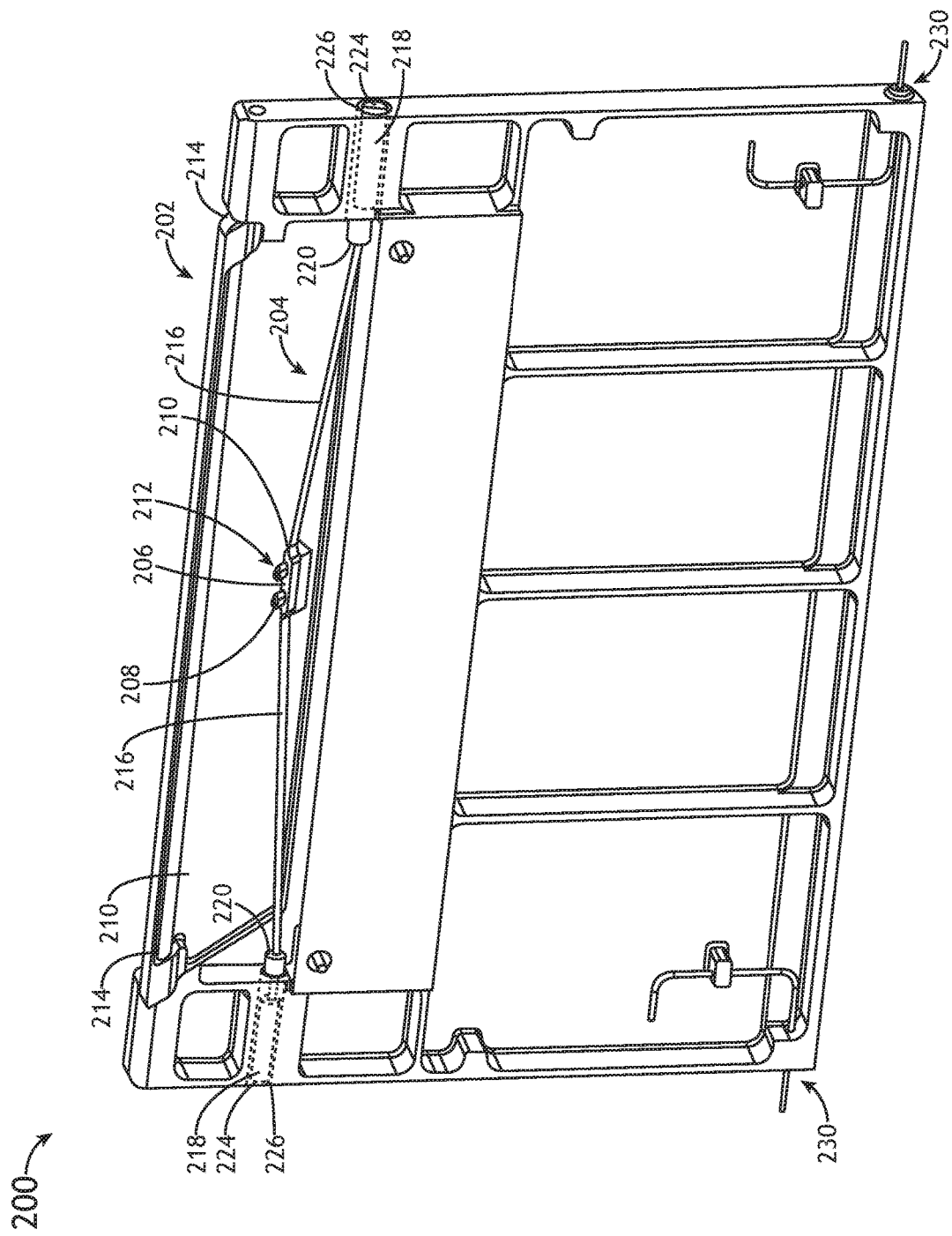
FIG. 2B illustrates an aircraft stowage compartment door including a flexible actuation assembly, in accordance with one or more embodiments of the disclosure.
Figure 2C:
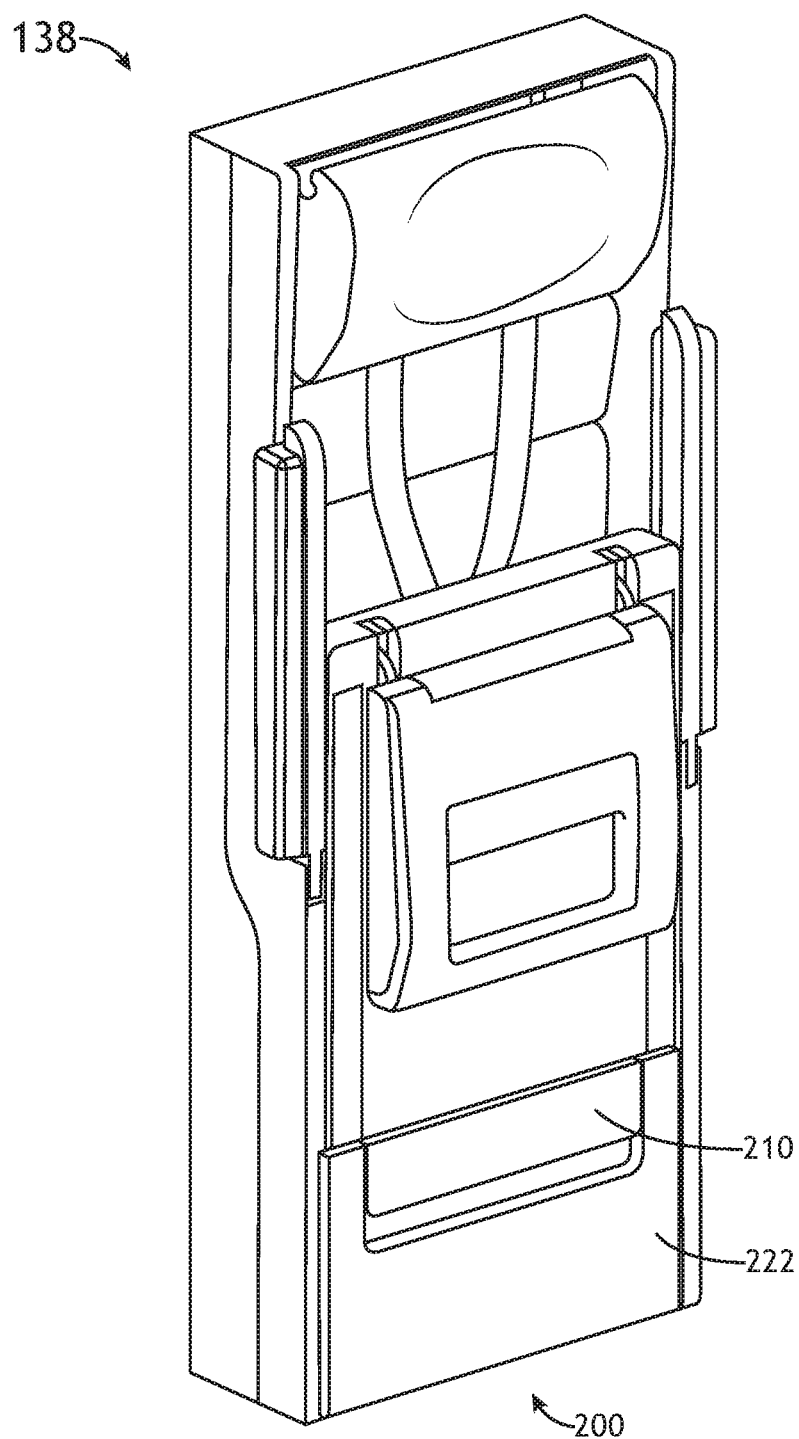
FIG. 2C illustrates an aircraft stowage compartment with an aircraft stowage compartment door including a flexible actuation assembly, in accordance with one or more embodiments of the disclosure.

As illustrated in FIGS. 2A and 2C, the inherent spring force may cause the one or more locking pins 218 to engage a sidewall of the stowage compartment 228 when the actuator 210 is not actuated. Engaging the sidewall of the stowage compartment 228 may lock the aircraft stowage compartment door 200 in a closed position.

Figure 2D:
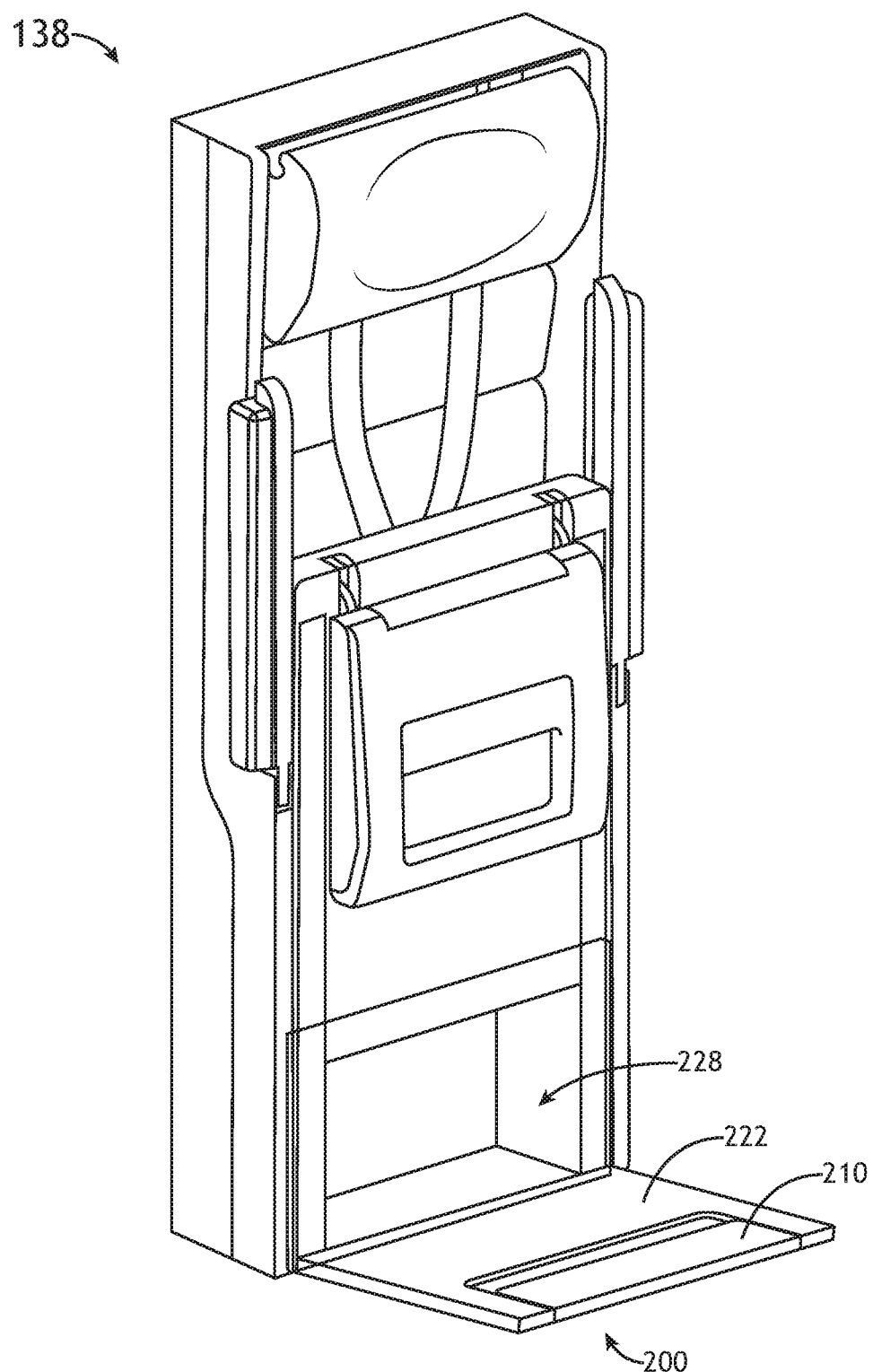
FIG. 2D illustrates an aircraft stowage compartment with an aircraft stowage compartment door including a flexible actuation assembly, in accordance with one or more embodiments of the disclosure.

As illustrated in FIGS. 2B and 2D, the inherent spring force may be overcome when the actuator 210 is engaged, such that the one or more locking pins 218 are unlocked from the sidewall of the stowage compartment 228. For example, engaging the actuator 210 may translate a load through the flexible linkage 204, causing the flexible linkage 204 to bend, which may retract the one or more locking pins 218. Disengaging the one or more locking pins 218 may allow the aircraft stowage compartment door 200 to rotate between the closed position and an open position (e.g., about an axis through one or more hinge pins 230).

When the actuator 210 is disengaged, the inherent spring force may cause the one or more locking pins 218 to return to a locked position (e.g., extended outward position). It is noted herein the one or more hinge pins 230 may be spring-loaded to assist the aircraft stowage compartment door 200 to close. In this regard, the ends 224 of the one or more locking pins 218 may be configured in a way to allow the aircraft stowage compartment door 200 to engage the cut-outs within the sidewall of the stowage compartment 228 to enter the closed position without outside assistance (e.g., an outside external force) other than the spring-loading of the one or more hinge pins 230.

It is noted herein that overcoming the spring force may cause the geometry of the flexible linkage 204 to elastically deform (e.g., as illustrated between FIG. 2A and FIG. 2B) and change one or more dimensions of the flexible linkage 204. For example, the one or more primary elements 216 may increase in length (e.g., stretch).

Although embodiments of the disclosure illustrate the flexible linkage 204 as including enough of a spring force to return the one or more locking pins 218 to the engaged position (e.g., extended outward position) following a disengaging of the actuator 210, it is noted herein the channel of the body 222 may include one or more springs in addition to or in the alternative to the inherent spring force of the flexible linkage 204, to assist in returning the one or more locking pins 218 to the engaged position (e.g., extended outward position). Therefore, the above description should not be interpreted as a limitation on the present disclosure but merely an illustration.

Figure 3A:
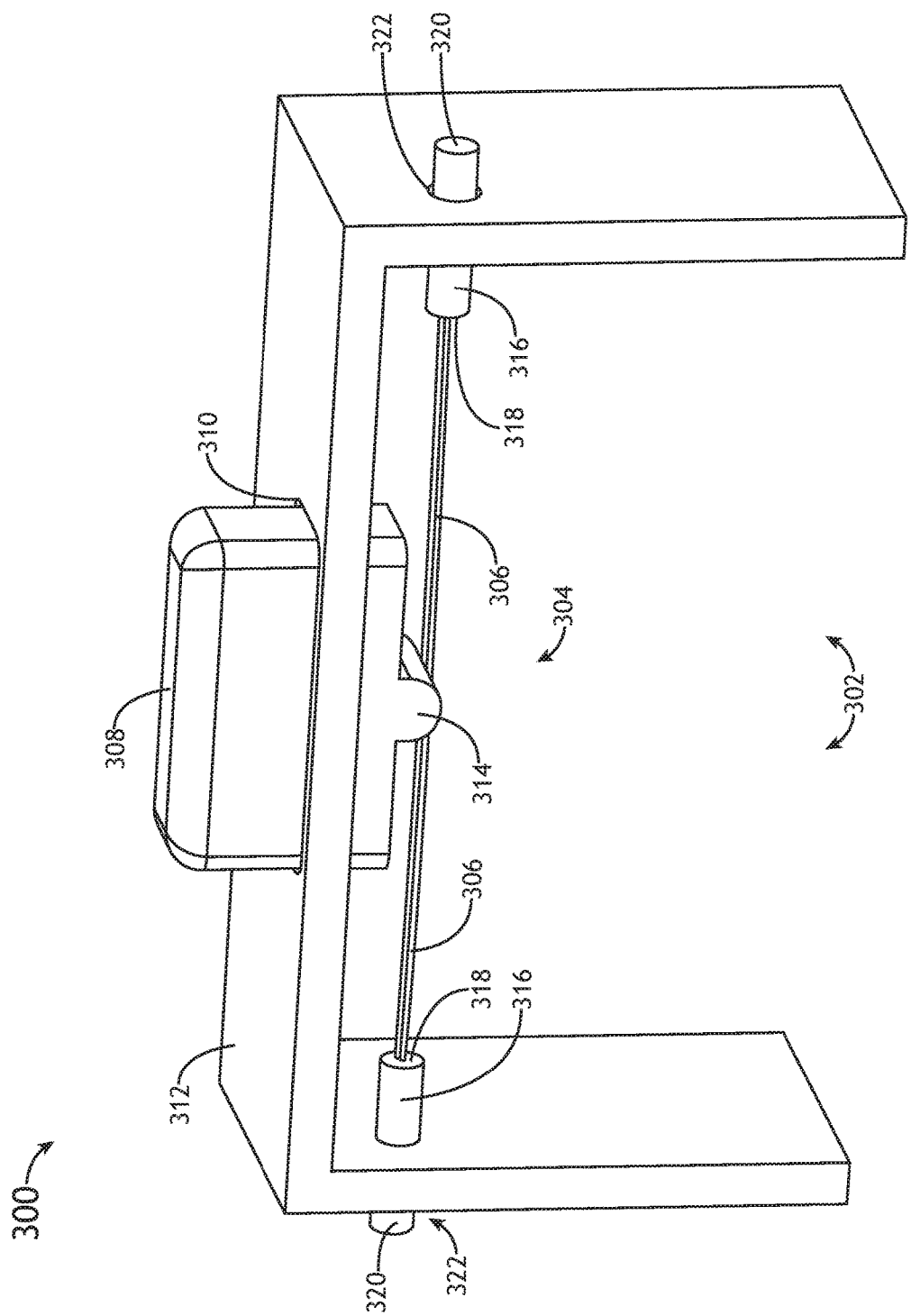
FIG. 3A illustrates an aircraft component including a flexible actuation assembly, in accordance with one or more embodiments of the disclosure.
Figure 3B:
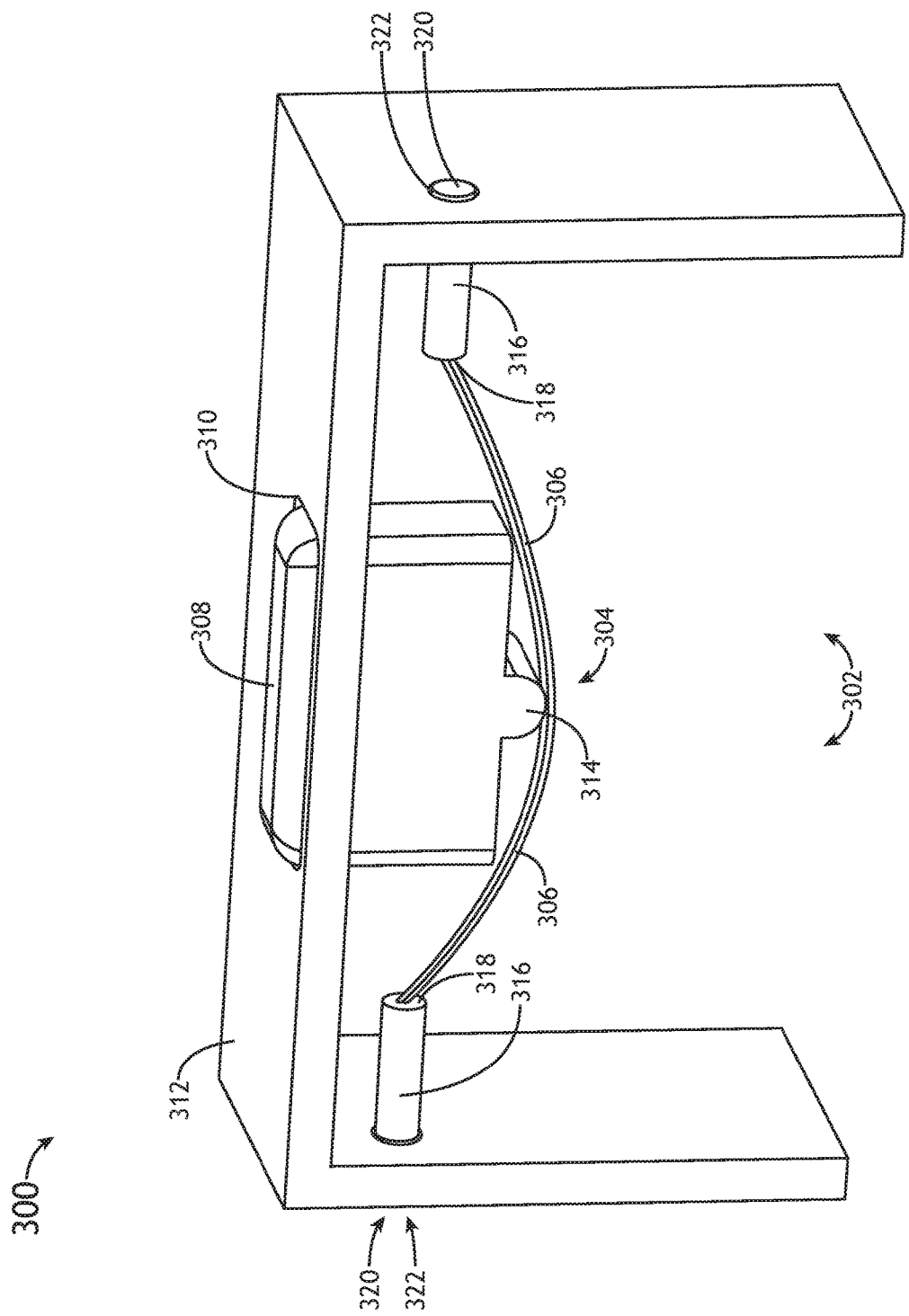
FIG. 3B illustrates an aircraft component including a flexible actuation assembly, in accordance with one or more embodiments of the disclosure.

FIGS. 3A and 3B generally illustrate an aircraft component 300 including a flexible actuation assembly 302, in accordance with one or more embodiments of the disclosure.

The flexible actuation assembly 302 may include a flexible linkage 304. The flexible linkage 304 may include one or more primary elements 306. For example, the flexible linkage 304 may include a single primary element 306. By way of another example, the flexible linkage 304 may include multiple primary elements 306 coupled together with a bracket.

A flexible actuation assembly 302 may include an actuator 308. The actuator 308 may include, but is not limited to, a button 308. For example, the button 308 may be configured to translate along an axis through a cut-out 310 in a body 312 of the aircraft component 300. By way of another example, the button 308 may be configured to translate along an axis via one or more rails, tracks, sliders, or the like. In general, the button 308 may be any component (e.g., handle, lever, knob, button, toggle, or the like) configured to act on the flexible linkage 304 when the actuator 308 is engaged via any rotational movement or translational movement.

At least a portion of the actuator 308 may engage the flexible linkage 304 (e.g., the one or more primary elements 306). For example, a protrusion 314 of the actuator 308 may be in contact with the flexible linkage 304. By way of another example, the flexible linkage 304 may pass through the protrusion 314 of the actuator 308. By way of another example, the flexible linkage 304 may be coupled to the protrusion 314 of the actuator 308 via a coupling joint. By way of another example, the flexible linkage 304 may be coupled to the protrusion 314 of the actuator 308 via an interlocking assembly. By way of another example, the protrusion 314 of the actuator 308 may be coupled to the flexible linkage 304 via one or more fasteners (e.g., screws, nuts, washers, or the like), an adhesive, or the like.

The flexible actuation assembly 302 may include one or more locking pins 316. The flexible linkage 304 (e.g., the one or more primary elements 306) and the one or more locking pins 316 may be coupled together via an interlocking assembly 318. For example, the interlocking assembly 318 may include a cut-out (e.g., a slot, a recess, a notch, a hole, a groove, or the like) on a locking pin 316 configured to receive a portion of the flexible linkage 304 (e.g., a protrusion or cap on a primary element 306). It is noted herein, however, that the one or more locking pins 316 and the flexible linkage 304 may be coupled together via one or more fasteners (e.g., screws, nuts, washers, or the like), an adhesive, or the like. Therefore, the above description should not be interpreted as a limitation on the present disclosure but merely an illustration.

It is noted herein the interlocking assembly 318 may be quick-release to allow for a swap of at least the flexible linkage 304 in the event of a malfunction or complete breakdown. For example, the interlocking assembly 318 may include tab-and-slot or tab-and-groove assemblies configured to couple the corresponding components together without the need for fasteners, adhesives, tools, or the like. For instance, the flexible linkage 304 may include a first component and the one or more locking pins 316 may include a second component, where disengaging the first component from the second component may uncouple the flexible linkage 304 from the one or more locking pins 316. Therefore, the above description should not be interpreted as a limitation on the present disclosure but merely an illustration.

Although embodiments of the disclosure illustrate the flexible linkage 304 as including only the one or more primary elements 306, it is noted herein the flexible linkage 304 may include one or more auxiliary elements. The one or more primary elements 306 and the one or more auxiliary elements may form a select geometry. For example, the select geometry may include a shape with a closed area having 2, 3, up to an N number of sides. For instance, the shape may include, but is not limited to, a kite, a diamond, a letter A, or the like. By way of another example, the select geometry may include a shape with an open area. For instance, the shape may include, but is not limited to, a letter T, I, V, or the like.

Each of the one or more locking pins 316 may be held in place within a sidewall of the body 312 of the aircraft component 300 (or via a bracket coupled to the aircraft component 300). An end 320 of the one or more locking pins 316 may be configured to pass through a cut-out 322 (e.g., a slot, a recess, a notch, a hole, a groove, or the like) in the side surface of the sidewall of the body 312 and engage a cut-out (e.g., a slot, a recess, a notch, a hole, a groove, or the like) in a structure positioned proximate to the aircraft component 300.

The flexible linkage 304 (e.g., the one or more primary elements 306) may be fabricated from a material configured to introduce a select amount of inherent spring force into the flexible actuation assembly 302.

As illustrated in FIG. 3A, the inherent spring force may cause the one or more locking pins 316 to extend outward (e.g., to engage a structure positioned proximate to the aircraft component 300) when the actuator 308 is not actuated.

As illustrated in FIG. 3B, the inherent spring force may be overcome when the actuator 308 is engaged, such that the one or more locking pins 316 pull inward. For example, engaging the actuator 308 may translate a load through the flexible linkage 304, causing the flexible linkage 304 to bend, which may retract the one or more locking pins 316.

When the actuator 308 is disengaged, the inherent spring force may cause the one or more locking pins 316 to return to an extended outward position. It is noted herein the ends 320 of the one or more locking pins 316 may be configured in a way to allow the one or more locking pins 316 to engage a structure positioned proximate to the aircraft component 300 without outside assistance (e.g., an outside external force).

It is noted herein that overcoming the spring force may cause the geometry of the flexible linkage 304 to elastically deform (e.g., as illustrated between FIG. 3A and FIG. 3B) and change one or more dimensions of the flexible linkage 304. For example, the one or more primary elements 306 may increase in length (e.g., stretch).

Although embodiments of the disclosure illustrate the flexible linkage 304 as including enough of a spring force to return the one or more locking pins 316 to the extended outward position following a disengaging of the actuator 308, it is noted herein the aircraft component 300 may include one or more springs and/or one or more brackets in addition to or in the alternative to the inherent spring force of the flexible linkage 304, to assist in returning the one or more locking pins 316 to the extended outward position. Therefore, the above description should not be interpreted as a limitation on the present disclosure but merely an illustration.

It is noted herein that any embodiment directed to the flexible actuation assembly 102 and/or the one or more components of the flexible actuation assembly 102 may be directed to the flexible actuation assemblies 202, 302 and/or the one or more components of the flexible actuation assemblies 202, 302 respectively. In addition, it is noted herein that any embodiment directed to the flexible actuation assembly 202 and/or the one or more components of the flexible actuation assembly 202 may be directed to the flexible actuation assemblies 102, 302 and/or the one or more components of the flexible actuation assemblies 102, 302 respectively. Further, it is noted herein that any embodiment directed to the flexible actuation assembly 302 and/or the one or more components of the flexible actuation assembly 302 may be directed to the flexible actuation assemblies 102, 202 and/or the one or more components of the flexible actuation assemblies 102, 202 respectively. Therefore, the above description should not be interpreted as a limitation on the present disclosure but merely an illustration.

It is noted herein that they may be a trade-off between rigidity and lifespan of the flexible linkage 114, 204, 304 depending on the fabrication material. In addition, it is noted herein the lifecycle of the flexible linkage 114, 204, 304 may depend on the geometry, the fabrication material, the surface finish of the flexible linkage 114, 204, 304, or other factors.

In this regard, the flexible actuation assemblies 102, 202, 302 may have fewer parts and assembly time than other known adjuster systems, which may result in a lower manufacturing cost and/or a lower possibility of a malfunction or complete breakdown. The flexible actuation assemblies 102, 202, 302 may be manufactured via an increased number of fabrication processes including, but not limited to, three-dimensional (3D) printing, injection molding, water-jet cutting, laser cutting, or the like. The flexible actuation assemblies 102, 202, 302 may be less weight, caused by the fewer numbers of parts and/or the use of a lighter material (e.g., a plastic-based material instead of a metal, or the like). The flexible actuation assemblies 102, 202, 302 may be more precise and/or accurate, with better performance than non-solid material components in other known adjuster systems.

Where the flexible actuation assemblies 102, 202, 302 are installed in an avionics environment, it is noted herein the flexible actuation assemblies 102, 202, 302 may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Although embodiments of the disclosure are directed to an avionics environment, it is noted herein the flexible actuation assemblies 102, 202, 302 are not limited to the avionics environment and/or the aircraft components within the avionics environment. For example, the flexible actuation assemblies 102, 202, 302 may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. For instance, the vehicle may include the aircraft 104. In addition, the vehicle may include an automobile. By way of another example, the flexible actuation assemblies 102, 202, 302 may be coupled to and/or configured to operate with apparatus sold for commercial or industrial use in either a home or a business. Therefore, the above description should not be interpreted as a limitation on the present disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A flexible actuation assembly for an aircraft component, the flexible actuation assembly comprising:

a flexible linkage including a plurality of primary elements, the plurality of primary elements each coupled to a respective locking pin of the flexible actuation assembly; and an extension linkage coupled to an actuator, the extension linkage including an element, the extension linkage coupled to the flexible linkage via a coupling joint, the coupling joint including an extension linkage paddle of the extension linkage and a flexible linkage paddle of the flexible linkage, the extension linkage paddle being coupled to the flexible linkage paddle, the flexible linkage including a plurality of auxiliary elements, the plurality of auxiliary elements coupled to the plurality of primary elements, the plurality of primary elements and the plurality of auxiliary elements forming a closed geometry, at least one dimension of the closed geometry configured to change when the load is translated through the flexible linkage, the flexible linkage coupled to the actuator of an aircraft component, the aircraft component including an aircraft seat pan, the flexible linkage configured to retract the respective locking pin from a lock position when a load applied to the actuator is translated through the flexible linkage, the aircraft seat pan configured to transition between an upright position and a recline position when the flexible linkage retracts the respective locking pin, the flexible linkage being fabricated from a material with a spring force able to return the respective locking pin to the lock position when the load is removed from the actuator.

2. The assembly of claim 1, the plurality of primary elements coupled to the respective locking pin via at least one interlocking assembly, the at least one interlocking assembly including a first component on the flexible linkage and a second component on the respective locking pin, the second component on the respective locking pin including a cut-out configured to receive the first component on the flexible linkage.

3. The assembly of claim 2, the flexible linkage being configured to uncouple from the respective locking pin when the first component on the flexible linkage and the second component on the respective locking pin are disengaged.

4. The assembly of claim 1, the flexible linkage being coupled to the aircraft component.

5. The assembly of claim 4, the flexible linkage including a mount plate, the mount plate being coupled to the aircraft component.

6. The assembly of claim 1, the flexible linkage coupled to the actuator of the aircraft component via a coupling joint.

7. The assembly of claim 6, the coupling joint including a mount plate of the flexible linkage and a mount plate of the actuator, the mount plate of the flexible linkage being coupled to the mount plate of the actuator.

8. The assembly of claim 1, the aircraft component including an aircraft stowage compartment door, the aircraft stowage compartment door configured to open and provide access to a stowage compartment when the flexible linkage retracts the at least one locking pin.

9. The assembly of claim 1, wherein the aircraft seat pan includes a cut-out in a side surface of the aircraft seat pan, an end of the at least one locking pin configured to pass through the cut-out in the side surface of the aircraft seat pan.

* * * * *